Feb. 21, 1950   C. M. BEESON   2,498,198
METHOD OF MEASURING PERMEABILITY
Filed Dec. 14, 1946
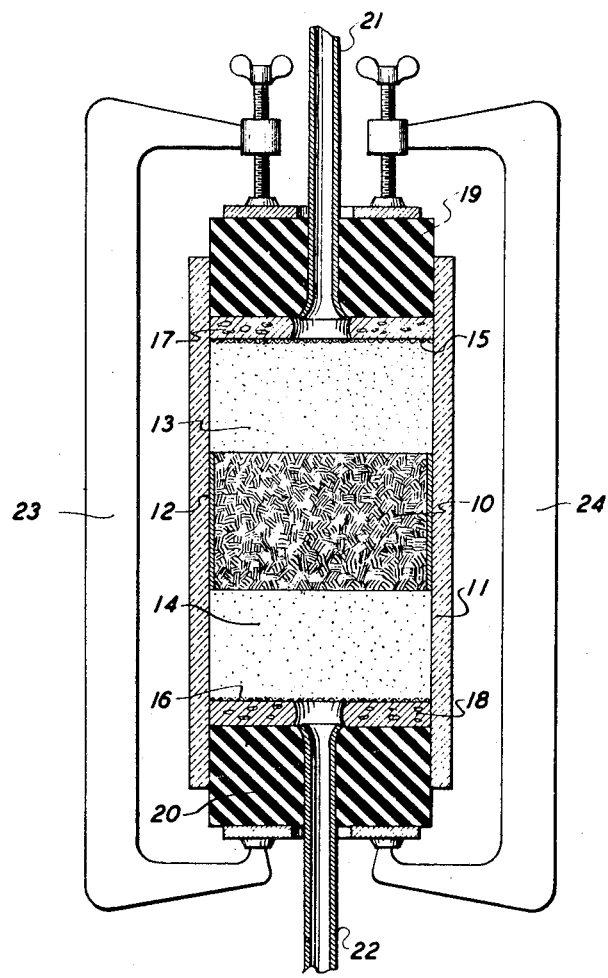
INVENTOR.
CARROL M. BEESON
BY
AGENT Patented Feb. 21, 1950

2,498,198

UNITED STATES PATENT OFFICE 2,498,198

METHOD OF MEASURING PERMEABILITY

Carrol M. Beeson, Los Angeles, Calif., assignor to Socony-Vacuum Oil Company, Incorporated, New York, N. Y., a corporation of New York Application December 14, 1946, Serial No. 716,393

4 Claims. (Cl. 73—38)

My invention relates to the measurement of the fluid permeability of lithological samples, particularly core samples taken from oil-producing formations.

Knowledge of the permeabilities of productive strata is of great value in determining various questions concerning the drilling and the subsequent control of wells for petroleum and other subterranean fluids. Therefore much effort has been expended in measuring the permeabilities of core samples, the standard method being to measure the flow of air through cleaned and dried specimens. In many cases it has been found that the permeability of a formation, as deduced from the productivity of wells, the viscosity of the fluid produced, the reservoir pressure, and other characteristics, is much less than the permeability of core samples from the formation as measured in the laboratory by flow of air. This strongly suggests that the customary method does not give a true measure of the reservoir permeability.

Apparently many productive formations contain minerals subject to hydration, and these minerals are naturally hydrated to a greater or less extent depending on the electrolyte content of the water present in the formation. When a core sample is dried preparatory to measuring its permeability, water of hydration is driven off; so that the sample actually tested may differ greatly from a true sample of the formation being studied. But the drying cannot be eliminated, as it is a necessary step in the reduction of the fluids present in the sample to a single phase, which is essential to accurate measurement of permeability.

If water instead of air be used in the test, the sample is restored to a state of hydration and much more useful measurements may be obtained. When the water has the same electrolyte content as the water of the formation the test yields a good measure of actual reservoir permeability, and when less saline water is used (resulting ordinarily in greater hydration of the minerals) the test yields data useful for predicting the effect on permeability of the intrusion of fresh water into the formation.

I have found, however, that the simple substitution of water for air in the standard test is unsatisfactory, as it yields highly inconsistent results. This is apparently due to the disintegration of samples while being tested. In some cases there is visible evidence of disintegration, and in other cases the samples are unchanged in appearance but give absurd results, such as greater permeability when measured with water than when measured with air.

An object of my invention is to provide a method of testing permeability which yields consistent results when water is employed as the testing fluid.

Another object of my invention is to provide a method of studying the flow through lithological samples of heterogeneous fluids including an aqueous phase.

Further objects and advantages of my invention will be apparent from the following description and from the drawing, in which:

The single figure is a vertical section illustrating my method of mounting a sample for test.

A fresh core sample is reduced to a block of standard dimensions, which may be cylindrical or of other form having end faces and, preferably, a uniform cross-sectional area. It is then extracted with a volatile organic solvent to remove interstitial oil and dried at about 225° F. to remove the solvent and such water as may be present. The prepared sample 10 is then set in the center of a short tube 11 by means of a layer of plastic 12, the end faces being left open. Tube 11 is of borosilicate glass, and plastic layer 12 is a composition of green optical pitch (Musto Keenan's No. 17) to which is added 20 ml. per pound of 100 second S. U. viscosity pale oil. The composition is maintained between 250° F. and 270° F. during the mounting of the sample.

Clean sand of uniform grain size and of coarse texture as compared with the core sample is then packed over each exposed end of the sample, forming sand packs 13 and 14. The sand packs are held in place by metallic screens 15 and 16 backed by disks 17 and 18 of sponge rubber.

Rubber stoppers 19 and 20, within which are mounted inlet tube 21 and outlet tube 22, are then inserted into the ends of tube 11 and are tightened by clamps 23 and 24.

At this time, if desired for purposes of comparison, a measurement of the air-permeability of the sample may be taken by connecting tube 21 to a source of air under known pressure, connecting tube 22 to a gas collector, and measuring the amount of air to pass through the sample in a particular time interval.

The measurement of water permeability should be made when the sample is as free as possible from other fluid phases. This condition may be attained by alternately evacuating the sample and flushing with carbon dioxide or other water-soluble gas, and maintaining low pressure (e. g., one millimeter of mercury) for several minutes just prior to the introduction of water.

Water of desired electrolyte content is then admitted by way of tube 21 and forced through the apparatus, displacing and dissolving any carbon dioxide remaining until the interstices in the sample and in the sand packs may be presumed entirely filled with water. The permeability test is not taken immediately, a period of two hours or more being allowed to intervene so that adequate hydration of the sample may occur.

At the end of the hydration interval, saline water is again forced through the apparatus, by known and constant pressure, and the amount of water to pass through in a given time is measured. From these data the permeability of the sample may be calculated.

I have experimented with the use of water from the formation being investigated, but great care must be taken when such water is used because of its tendency to form suspensions of alkaline-earth carbonates, ferric hydroxide, and the like which clog the pores of the sample and result in inaccurate data. It is therefore preferable to use a prepared water, equivalent to the formation water in its action upon hydratable minerals, but free of iron and carbonates. The test water may be prepared by adding to distilled water the same electrolytes present in the formation water in the same proportions, with the exceptions that calcium is substituted for iron, chloride is substituted for bicarbonate, and sulphate is substituted for carbonate, and that the pH of the prepared water is adjusted to equal that of the formation water by adding the required amount of sodium hydroxide or hydrochloric acid. When information concerning the formation water is lacking, a solution containing an average concentration of each electrolyte is used, with the same substitutions.

A test water brought to the proper salinity by the addition of sodium chloride, alone, yields a fair approximation of the formation-water permeability, but it is likely to so alter the sample as to greatly exaggerate the effect of the fresh water which may be used in a subsequent test of the same sample. Apparently, in the absence of bivalent ions, sodium clays are formed from the natural calcium and magnesium clays by base exchange, and the former are hydrated and deflocculated by fresh water to a much greater extent than the latter.

A further test, using fresh water instead of saline water, is frequently desirable in order to determine what effect fresh water (drilling-mud filtrate, for example) may be expected to have on permeability of the formation. To accomplish this, stopper 19, disk 17, and screen 15 are removed, and sand pack 13 is thoroughly washed with distilled water. The apparatus is then reassembled, and one or two pore volumes of distilled water are forced through. A considerably longer hydration interval, such as twenty-four hours, is permitted to elapse, and then the permeability test is performed in the manner indicated above, using distilled water.

A test more specific to the effect of mud filtrate on permeability may precede the distilled water test or may be substituted for it. A fluid loss is collected from mud used or contemplated for use in the zone from which the core sample was taken. Sand pack 14 is replaced with sand saturated with the mud filtrate, and one or two pore volumes of the filtrate are forced through the core sample in the direction opposite the previous flow of formation water. After a period of twenty-four hours has elapsed for hydration, sand pack 13 is flushed with synthetic formation water, and permeability to the formation water is again measured in the original direction. Such tests are useful in determining if the use of a saline drilling mud is justified in a particular zone.

In general, when a series of two or more tests using waters of varying degrees of salinity is performed, the waters should be used in order of decreasing salinity. This is because the effect of salt water to reverse a hydration previously caused by less saline water is extremely slow and uncertain.

A measurement of true permeability requires that no more than one fluid phase be present. However, my method is also applicable to investigations of the flow of heterogeneous fluids, in which extended tests may be made, employing various significant combinations of the three fluid phases, oil, water, and gas. For example, the interstices of the sample may be filled with water and subsequently oil may be forced through while the rate of flow and the composition of the effluent are observed, to obtain data on flow through a hydrated sample filled with various proportions of oil and water. Subsequently, the oil in the sample may be displaced by water or gas, thus approximating the conditions of water-drive or gas-drive in a formation.

If an oil containing dissolved gas under pressure be passed through a water-wet sample, the gas being released by the falling pressure gradient within the sample, a three-phase system closely approximating actual conditions adjacent the producing zones of many wells is achieved.

Studies of polyphase flow require very careful technique and are difficult to standardize, and so are not suitable for routine core analysis. However, such investigations yield valuable information, and previous experimental methods have not usually been capable of yielding dependable results when consolidated lithological samples containing hydratable materials are used and when an aqueous phase is present.

In measuring permeability and studying polyphase flow by the method above described, I have found substantially no evidence of core disintegration during the tests, and I have obtained a body of data which is self-consistent and which is much more useful than the standard permeabilities as measured with air.

It appears that the mechanical pressure applied to the sample through the sand packs prevents motion of the core solids, and thus forces particles which swell when hydrated to resume their original positions, or, in the case of hydration greater than the original, to take positions resembling those which they would take in the formation in the event of increased hydration. In the absence of mechanical pressure, unless a core sample has exceptional tensile strength, the expanding particles tend to spread apart the grains of the sample, thus widening interstices, opening new channels, sometimes breaking fragments from the unsupported surfaces, and generally causing radical alteration of the natural structure of the sample.

In this description of my method and in the following claims, the term "sand" is used in the broad sense, denoting not only naturally occurring granules of quartz, but also similar loose granules of other hard substances, either natural or artificial.

I claim as my invention:

1. The method of measuring fluid flow through a lithological sample which comprises: shaping said sample to a block of standard dimensions; sealing said shaped sample to the inner surface of the medial portion of a rigid tube; packing a body of sand against the entire surface of each exposed end of said sample; placing a foraminous retaining member over the outer end of each of said sand packs; compressing said sand packs against said sample; forcing fluid under known pressure through said sample and said sand packs; and measuring the rate of flow of said fluid.

2. The method of measuring the permeability of a lithological sample which comprises: shaping said sample to a block of standard dimensions; sealing said shaped sample to the inner surface of the medial portion of a rigid tube; packing a body of sand against the entire surface of each exposed end of said sample; placing a foraminous retaining member over the outer end of each of said sand packs; compressing said sand packs against said sample; removing water-insoluble vapor and gas from the interstices of said sample and of said sand packs; forcing water under known pressure through said sample and said sand packs; and measuring the rate of flow of said water.

3. The method of measuring the flow of heterogeneous fluid through a lithological sample which comprises: shaping said sample to a block of standard dimensions; sealing said shaped sample to the inner surface of the medial portion of a tube; packing a body of sand against each exposed end of said sample; placing a foraminous retaining member over the outer end of each of said sand packs; compressing said sand packs against said sample; introducing a first fluid into the interstices of said sample; forcing a second fluid, at least partially immiscible with said first fluid, under known pressure through said sample and said sand packs; and measuring the rate of flow of said fluids.

4. The method of measuring fluid flow through a lithological sample which comprises: shaping said sample to a block of standard dimensions; sealing said shaped sample to the inner surface of the medial portion of a tube; packing a body of sand against each exposed end of said sample; placing a foraminous retaining member over the outer end of each of said sand packs; compressing said sand packs against said sample; saturating said sample with fluid; maintaining the saturation until physiochemical equilibrium between said sample and said fluid is substantially reached; forcing test fluid under pressure through said sample and said sand packs; and measuring the rate of flow of said test fluid.

CARROL M. BEESON.

REFERENCES CITED

The following references are of record in the file of this patent:

UNITED STATES PATENTS

| Number | Name | Date |
|---|---|---|
| 2,296,852 | Horner | Sept. 29, 1942 |
| 2,327,642 | Horner | Aug. 24, 1943 |
| 2,330,721 | Leverett | Sept. 28, 1943 |
| 2,345,935 | Hassler | Apr. 4, 1944 |
| 2,348,985 | Lewis | May 16, 1944 |